United States Patent Office 3,152,147
Patented Oct. 6, 1964

3,152,147
1,6 - BIS - (BETA - CHLORO - ETHYLAMINO) - 1,6-DIDESOXY-D-MANNITOL AND ITS DICHLORO-HYDRATE
László Vargha and Boris Dumbovich, Budapest, Hungary, assignors to Gyogyszeripari Kutato Laboratorium, Budapest, Hungary
No Drawing. Filed July 8, 1958, Ser. No. 747,119
Claims priority, application Hungary, Dec. 20, 1954, GO 405
1 Claim. (Cl. 260—340.9)

The present invention is concerned with certain novel nitrogen containing derivatives of mannitol, more particularly it relates to 1,6-bis-(β-halogeno-ethyl-amine)-1,6-didesoxy-D-mannitol and a method of preparing the same.

We have found that 1,6-bis-(β-halogeno-ethylamine)-1,6-didesoxy-D-mannitols and their salts possess valuable properties when used as therapeutic agents. In the treatment of haemoblastosis as chronic lymphoid and myeloid leukaemia and lymphogranulomatosis (Hodgkin's disease) excellent results were obtained consisting in discontinuance of complaints and anomalies for 3 months to two years while practically no by-effects were shown.

The new 1,6-bis-β-halogeno-ethylamino-derivatives may be prepared by reacting the 1,6-ethyleneimino-derivative of mannitol with a hydrogen halide. The course of this reaction may be illustrated as follows:

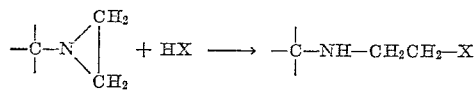

(where X stands for halogen).

The ethylene-imino-mannitol derivatives may contain substituents, as for example isopropylidene-, benzylidene-, ethylidene- or methylene-groups. These groups are as a rule eliminated during hydrogen halide treatment.

The secondary bases obtained by this reaction form the corresponding hydrogen halide salts if excess acid is present.

The ethyleneimino-derivatives, serving as starting materials of the process according to the invention are new compounds which were heretofore unknown, therefore a process is shown for their preparation of one of them, namely the 1,6 - bis-ethyleneimino-1,6-desoxy-3,4-isopropylidene-mannitol: 30 ml. of ethyleneimine are added to 20 g. of 1:2–5:6-dianhydro-3:4-isopropylidene-D-mannitol (prepared as described by L. F. Wiggins: J. Chem. Soc., 1946, 384) in a glass flask provided with a reflux cooler and closed with a calcium chloride tube. The temperature of the mixture gradually rises but is kept below 50° C. The main reaction being complete, the mixture is allowed to stand for one day at room temperature and afterwards heated on a water-bath for 30 minutes. Excess ethyleneimine is then distilled off in vacuo. The residue is a thick syrup, the analysis of which corresponds to that of 1:6-bis-ethyleneimino-1:6-didesoxy-3:4-isopropylidene-D-mannitol of the formula

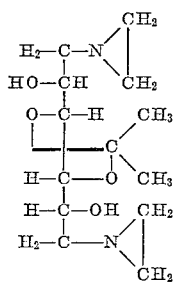

In order to obtain this product in a stable crystalline form, a hydroxyl-free organic solvent such as benzene, chloroform or dichloroethane is added to the reaction mixture after evaporation of the excess ethyleneimine, and the mixture thus obtained is distilled until the distillate runs down neutral so as to eliminate traces of ethyleneimine and other volatile by-products. On cooling 1,6-bis-ethyleneimino-1,6-didesoxy-3,4-isopropylidene-D-mannitol crystallizes from the reaction mixture. Crystallization may be accomplished by addition of ether or dioxane. This product has pharmaceutical properties similar to those of the halogeno ethylamino derivatives. By treatment of sarcoma Crocker, sarcoma $S_{37}$, and carcinoma Ehrlich with the product, a considerable decrease of the disease was observed (35%, 53% and 76.7%, respectively). The treatment of ascites Ehrlich resulted in complete recovery. The product is also a valuable intermediate compound when preparing 1,6 - bis - (beta-chloro-ethylamino)-1,6-didesoxy-D-mannitol, which is obtained with a 90% yield from this starting material.

In order that the invention may be well understood the following examples are given by way of illustration only:

Example 1

1,6 - bis-ethyleneimino-1,6-didesoxy-3,4-isopropylidene-D-mannitol obtained from 20 g. of 1,2,5,6-dianhydro-3,4-isopropylidene-D-mannitol is dissolved in 20 ml. of methanol and the solution is slowly added into 100 ml. of concentrated hydrochloric acid cooling with ice while stirring. The reaction mixture is allowed to stand overnight at room temperature. The hydrochloric acid addition to the ethyleneimino group occurs during this time and the isopropylidene group splits off in the form of acetone. The following day the crystalline mass is filtered off with suction, washed with some 80% alcohol and dried in vacuo in turn over concentrated sulphuric acid and solide caustic soda. The dry substance, weighing about 28 g. is mixed with 100 ml. of lukewarm water, the insoluble part centrifuged off, the solution evaporated to dryness in vacuo and the residue recrystallized from 80% alcohol, after decolorization with active carbon. 20 g. of a colourless substance, readily soluble in water, M.P. 241° C. (decomp.); $[\alpha]_D^{18} = +18.46°$ (c., 1.812 in water), whose analysis corresponds to that of 1,6-bis-(β-chloro-ethylamino)-1,6-didesoxy-D-mannitol dihydrochloride is obtained.

The product dissolves easily in water and is a tasteless and odorless white powder. For pharmacological experiments it is expedient to solve in physiological saline solution but it may be solved in other solvents as well. (Aqueous solution of vitamine C, dextrose, etc.) Its water solution is stable.

Example 2

8.16 g. of 1,6 - bis-ethyleneimino-1,6-di-desoxy-3,4-isopropylidene-D-mannitol are dissolved in 9 ml. of abs. methanol. The solution is added slowly to 42.5 g. of 48% hydrogen bromide, while cooled with ice. On stirring for an hour, at 0° C. crystals are precipitated. The reaction mixture is set aside for 24 hours, then the reaction mixture is filtered by suction, washed with 96% ethanol and dried under reduced pressure. Yield 9.87 g. 1,6 - bis-(β-bromo-ethylamino)-1,6-didesoxy-D-mannitol-dihydrobromide. The product may be recrystallized from aqueous dioxane or from isopropanol. M.P. 204-205° C.

On mice inoculated with leukaemia of the AKR-Patterson stem, neoplastic growth disappeared completely upon treatment with 6 mg./kg. doses of the 1,6-bis-(β-chloro - ethylamino) - 1,6 - didesoxy-D-mannitol dihydrochloride, prepared according to Example 1, and a considerable decrease in the number of leucocytes occurred.

The above said compound according to experiments carried out on animals, for instance: Guérin carcinoma, Yoshida sarcoma, Walker carcinoma and Crocker sarcoma on rats and Ehrlich carcinoma on mice shows that it greatly inhibits the development of tumors and it prolongates essentially the life of these animals. 15–15 rats were inoculated simultaneously with Guérin carcinoma. The tumor is well developed after about 2 weeks. The treatment was effected intraperitoneally with 6 mg./kg. doses administered every 2d or 3d day for 3 weeks. The average tumor weight of the untreated animals was 69 g., while the average tumor weight of the treated animals was 14 g. in the case of the above-said dihydrochloride salt. The same treatment effected with dihydrobromide salt, according to Example 2, resulted an average tumor weight of 8 g.

In another experiment all 15 control animals died within 2 months after the beginning of the above said treatment, whilst 11 of the 15 analogously treated animals remained alive. The results obtained were still better with Yoshida sarcoma, because whilst the average tumor weight of the animals treated with 1,6-bis-($\beta$-chloro-ethylamino)-1,6-didesoxy-D-mannitol dihydrochloride was 2.0 g., whilst treated with 1,6-bis-($\beta$-bromo-ethylamino)-1,6-didesoxy-D-mannitol-dihydrobromide was 1.25 g. The tumors treated with both of the above said compounds have been examined histologically and no specific tumor cells have been found, only proliferative fibrous tissues. As it is, for the majority of rats inoculated with Yoshida sarcoma a real recovery could be attained. In this experiment the average tumor weight of untreated animals was 17 g.

In experiments carried out on human patients 0.8–2 mg./kg of the compound were administered preferably, amounting to 800–1300 mg. in the course of the treatment. The following effects were shown: 52 patients suffering from chronic lymphoid leukaemia were treated. In the case of 45 patients complaints and symptoms ceased for 3 months after treatment, 41 were symptomless after a year and 26 were even symptomless two years after treatment.

In the greater part of these cases absolutely no more signs of lymphoid leukaemia may be observed and the bone marrow and blood picture are normal.

To 18 patients suffering from chronic myeload leukaemia the above said compound was administered causing disappearance of symptoms in 14 cases for three months; 9 cases for 6 months, 6 cases for a year and 5 cases for two years.

In 59 cases of lymphogranulomatosis (Hodgkin's disease) 51 patients were symptomless for 3 months after the treatment, 46 patients for 6 months, 38 patients for a year and 22 patients for two years after the treatment.

In 17 cases of lympho-sarcoma when treated as shown above the patients turned symptomless for 3 months after treatment, in 13 cases and in 5 cases the patients were still symptomless after 2 years.

Example 3

To 27 g. of 1,2-5,6-dianhydro-3,4-isopropylidene-D-mannitol 40 ml. of ethyleneimine were added. An exothermic reaction started during which a temperature of 45° C. was maintained. When no further heat development was observed, the greater part of the ethyleneimine excess was evaporated under reduced presure. After addition of 3 x 30 ml. of anhydrous benzene, distillation under reduced pressure was continued until the distillate showed a neutral pH value. The resulting syrupy benzene solution weighed about 50 g. The solution was kept for 24 hours in an ice box. The precipitated crystals were than filtered and dried in vacuo over alkali. 10 g. of 1,6 - bis-ethyleneimino-7,6-didesoxy-3,4-isopropylidene-D-mannitol were obtained. M.P. 91–92° C. $[\alpha]^{20}=26.12°$ in chloroform (c.=1.835).

*Analytical data.*—Found: C%=57.45, H%=8.84, N%=10.27. Theory: C%=57.40, H%=8.80, N%=10.30.

The product was readily soluble in water, alcohols, acetone, benzene, halogenated hydrocarbons, ethanolamine. Slightly soluble in ether and dioxane.

Example 4

To the syrupy benzene solution of Example 3, 100 ml. of ether were added. The mixture was kept for 24 hours in an ice box, then the crystals were filtered and dried in vacuo. 17.5 g. of 1,6-bis-ethyleneimino-1,6-didesoxy-3,4-isopropylidene-D-mannitol were obtained. M.P. 91–92° C.

Example 5

40 ml. of ethyleneimine and 0.1 g. of sodium were added to 27 g. of 1,2-5,6-dianhydro-3,4-isopropylidene-D-mannitol. The reaction mixture was further treated as described in Example 3 or 4. 19 g. of 1,6-bis-ethyleneimino-1,6-didesoxy-3,4-isopropylidene - D - mannitol were obtained. M.P. 92° C.

Example 6

40 ml. of ethyleneimine and 0.1 g. of sodium were added to 27 g. of 1,2-5,6-dianhydro-3,4-isopropylidene-D-mannitol. After termination of the exothermic reaction, the greater part of the ethyleneimine excess was distilled in vacuo, whereupon 3 x 30 ml. of dichloroethane were added. After distillation under reduced pressure, 100 ml. of ether were added to the syrupy residue obtained. On standing for 24 hours in an ice box, the precipitated crystals were filtered. 15 g. of 1,6-bis-ethyleneimino - 1,6 - didesoxy-3,4-isopropylidene-D-mannitol were obtained. M.P. 92° C.

The product may be purified preferably by recrystallization from acetone.

This application is a continuation-in-part of serial No. 550,864, filed December 5, 1955, now abandoned.

What we claim is:

A new compound selected from the group consisting of 1,6 - bis - ($\beta$-chloro-ethylamino)-1,6-didesoxy-D-mannitol and its dichlorohydrate.

No references cited.